Feb. 12, 1924.
H. G. PELSTRING
MATCH BOX HOLDER
Filed Sept. 17, 1921
1,483,592
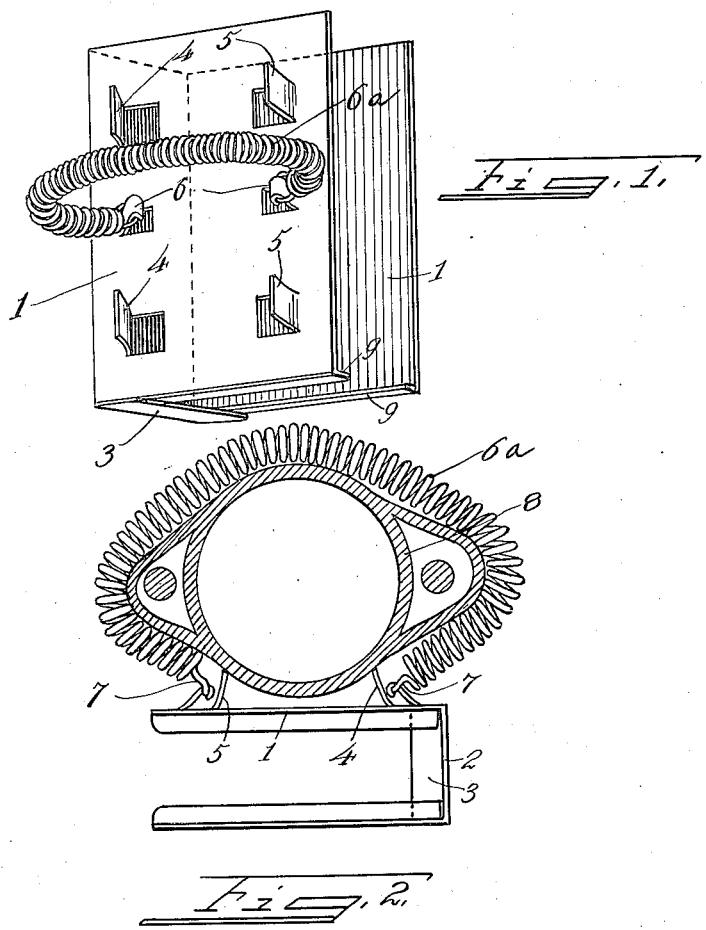
INVENTOR:
Henry G. Pelstring
BY Allen & Allen
ATTORNEYS.

Patented Feb. 12, 1924.

1,483,592

UNITED STATES PATENT OFFICE.

HENRY G. PELSTRING, OF COVINGTON, KENTUCKY, ASSIGNOR, BY MESNE ASSIGNMENTS, TO THE KEMPER-THOMAS COMPANY, OF NORWOOD, OHIO, A CORPORATION OF OHIO.

MATCH-BOX HOLDER.

Application filed September 17, 1921. Serial No. 501,441.

*To all whom it may concern:*

Be it known that I, HENRY G. PELSTRING, a citizen of the United States, and a resident of Covington, in the county of Kenton and State of Kentucky, have invented certain new and useful Improvements in Match-Box Holders, of which the following is a full, clear, and exact description, reference being had to the accompanying drawings, forming part of this specification.

My invention relates to holders for match boxes to be used in automobiles for retaining preferably a box of safety matches in convenient position for use by the driver.

I am aware that devices of this character have been produced in the past, but to the best of my knowledge they have been arranged to be mounted on the spokes or the rim of the vehicle steering wheels and are thus liable to contact with the spark and throttle levers, or else they are not provided with any readily detachable mounting such as will hold the box against shifting about when a match is being struck.

It is the object of my invention to provide a match box holder which is readily attachable and detachable from the steering columns in motor vehicles, and to so arrange the box and its mounting that it will fit any column and will not shift when a match is being struck.

In so doing I place the holder entirely out of the way of the driver of the car, and provide a convenient, non-windy place for striking the match. I furthermore provide an inexpensive device which comes within the range of advertising novelties.

I accomplish my objects above stated and other advantages to be noted by that certain construction and arrangement of parts to be hereinafter more specifically pointed out and claimed.

In the drawings,

Figure 1 is a perspective view of the device.

Figure 2 is a horizontal section taken through the box, showing it as mounted on an odd-shaped steering column, such as is used in Ford automobiles.

The holder itself I preferably form from a piece of sheet metal, such as brass, which is bent to form sides 1, 1, and a back 2. At the underside of the device a tongue 3 is left which is turned under, as shown, to form a supporting base for a match box. The three-sided structure will grasp a box of safety matches and hold it tight against tilting outwardly, while the turned under tongue holds it against being forced downwardly.

At the face of the device to be mounted against the steering column of a vehicle I form preferably three sets of tongues,—the upper and lower pair of tongues 4 and 5 and the central tongues 6. These tongues are all made by slitting the metal and bending outwardly the slit portions.

The central tongues are pierced with suitable holes, or the metal is folded over to form eyes, while the remaining pairs are left protruding from the side of the holder.

I provide as a mounting device a coiled spring $6^a$, the ends 7 of which are formed with hooks to engage in the holes in the central set of tongues.

In mounting the device, the spring is hooked into one of the tongues, the holder adjusted to the desired position along a steering column 8 and the spring brought around the column and hooked at the other end.

The tongues 4 and 5 are used as abutments against the steering column, and find a solid support thereon, whereas if the side of the holder abutted against the column it would find a rocking seat rather than a flat one, due to the usual curved nature of a steering column.

The spring will naturally expand to suit various diameters and shapes of post, and due to the spring engagement and the solid bearing of the tongues, the holder will not shift about either when not in use or when a match is being struck on the side of a safety match box supported therein.

As shown in the particular form of device in the drawings, the under edges of the side pieces are turned in also to support the match box, as at 9, 9, and this is preferred as it gives added support to the box against being pressed down or rocking out of shape.

Having thus described my invention, what I claim as new and desire to secure by Letters Patent, is:—

1. A device of the character described, comprising a three-sided holder for a box of safety matches or the like, abutments on said holder adapted to straddle and find a bearing against other than a flat steering column, and a spring, said spring and holder having inter-engaging means thereon, whereby the spring can be set around a steering column and hold the box abutments thereagainst, as and for the purpose described.

2. A device of the character described, comprising a holder or container having a straight inner face, abutments formed on said inner face in spaced relation to form abutments against other than a flat surface, and a coiled spring secured at its ends to the holder, and adapted to pass around the steering column of a vehicle or the like.

3. A device of the character described, comprising a holder for match boxes or the like, formed of a piece of metal bent into three-sided shape, tongues turned up in one of the sides, a coiled spring, and means on the spring and said tongues for attachment to each other, as and for the purpose described.

4. A device for containing matches or the like, for mounting against a rounded support, comprising a holder provided with a straight inner face having spaced abutments thereon to straddle the rounded portions of the support and find a full abutment thereagainst, and a coiled spring connected at a plurality of points to the holder, and adapted to pass around said rounded support.

HENRY G. PELSTRING.